Figure 1:
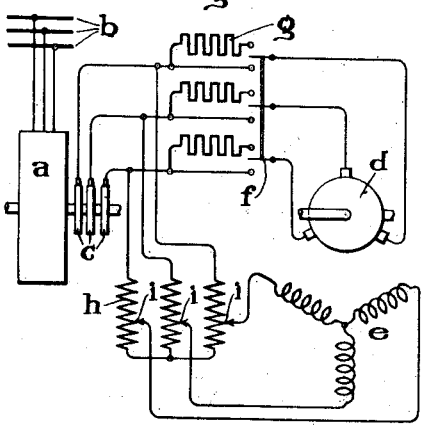

Aug. 24, 1926.

W. SEIZ 1,597,485

REGULATION OF INDUCTION MOTOR CASCADES

Filed August 13, 1923

Inventor:
Walter Seiz,
by *Alexander F. [signature]*
His Attorney.

Patented Aug. 24, 1926.

1,597,485

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

REGULATION OF INDUCTION-MOTOR CASCADES.

Application filed August 13, 1923, Serial No. 657,227, and in Germany August 23, 1922.

My invention relates to the speed regulation of machines which are used in connection with regulating exciters and in particular to the speed control of an induction motor used in connection with a regulating commutator exciter connected in cascade relation with the induction motor.

In the well known cascade connections of an induction motor with a commutator regulating machine, which is located either on the shaft of the induction motor, or comprises one element of a regulating set, the size of the commutator machine or the entire regulating set, must be proportioned in accordance with the scope of regulation desired; that is to say, the size and cost of the regulating apparatus is about proportional to the extent of the desired speed regulation figured from the synchronous speed of the induction motor. It frequently happens that with a given cascade having a normal range of speed regulation, it is desirable to occasionally go to a speed considerably below the normal regulating range. In such a case it would not be good economy to design the regulating exciter or set to take in the lowest speed desired since the size and cost of the regulating equipment would need to be materially increased and the necessity for the use of the larger equipment would be small.

The primary object of my invention is to provide a practical solution for this problem. In carrying my invention into effect, the commutator exciter is laid out only for the speed regulating range occurring under normal conditions. To regulate the induction motor speed below this range I provide a resistance to be inserted into the secondary circuit of the induction motor after the voltage of the commutator machine has been increased to its highest value and thus, after the lowest normal speed of the usual regulating equipment has been reached. For the abnormal low speeds the voltage drop in the resistance plus the voltage of the commutator machine is made about equal to the slip voltage of the induction motor occurring at said speeds. Thus, the speed of the motor may be regulated below the range of the particular commutator machine and the total range of regulation increased with a smaller outlay for regulating equipment than would be the case if the commutator machine were designed to cover the entire range of regulation. The electrical efficiency of such a system when operating below the normal regulating range is somewhat impaired, but since it is assumed that the low speed operation is needed only occasionally, while the normal regulating range is used most of the time, the loss resulting from the occasional decrease in electrical efficiency becomes insignificant as compared to the saving made by the use of the smaller commutator machine.

The invention also includes a preferred type of equipment for regulating the voltage of the commutator machine and the cutting in and out of the resistance combined in such a manner that changes in the speed are accomplished gradually when the resistance is cut in or out, together with automatic devices where they are desired.

Figure 2:
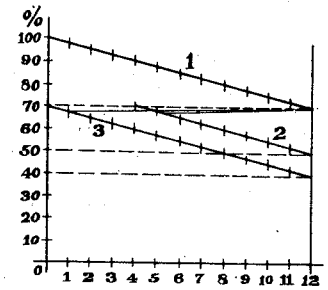
Figure 3:
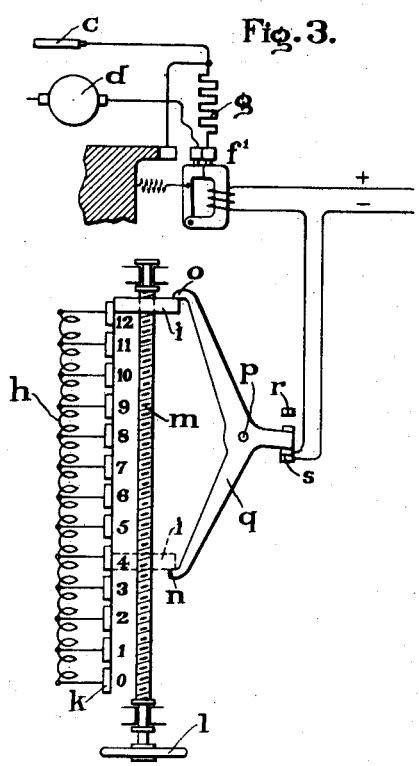
Figure 4:
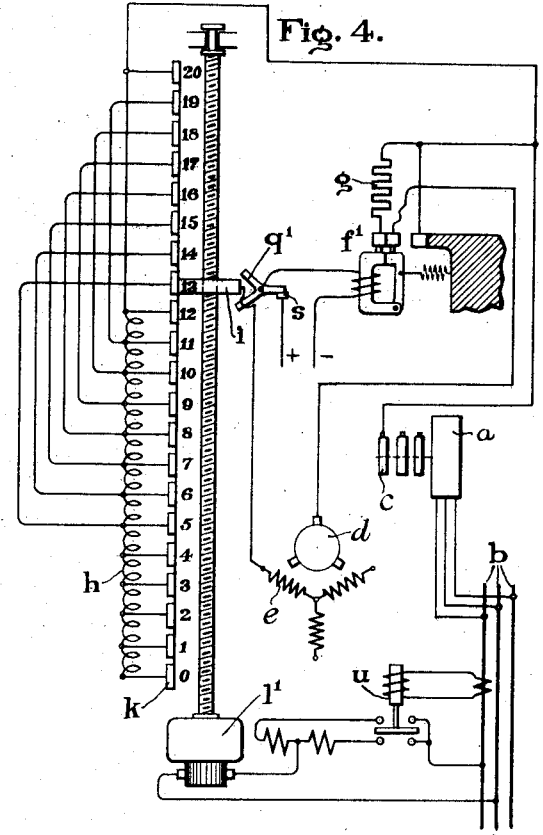

The features of my invention which I believe to be novel and patentable will be pointed out in the claims appended hereto. For a better understanding of my invention reference is made to the following description taken in connection with the accompanying drawing, Fig. 1 of which represents a complete wiring diagram and layout for a simple embodiment of my invention; Fig. 2 represents characteristic curves illustrative of the speed regulation obtainable by my invention; and Figs. 3 and 4 represent preferred forms of the regulator itself, together with certain automatic regulating features to be referred to.

Referring to Fig. 1, $a$ is the induction motor which is fed from the power lines $b$. $c$ are the slip rings of the rotor of the induction motor, $d$ is the armature and $e$ the exciter winding of the commutator machine. The armature $d$ can be connected to the slip rings $c$ directly or through the resistance $g$ by means of a double throw switch $f$. The exciter winding $e$ is fed by a regulable transformer $h$ from the slip rings of the induction motor. The normal speed regulation of the motor is effected by the displacement of the movable contacts $i$ on the transformer $h$ whereby a more or less of the slip ring voltage is caused to effect the exciter winding $e$. If these contacts move to the star point of the transformer, the winding $e$ receives no excitation, the commutator machine has no voltage and the induction motor runs at approximately synchronous speed when the resistance $g$ is not in circuit.

If, however, the contacts *i* are moved to the other end of the transformer winding, the exciter winding *c* becomes fully excited, the armature of the commutator machine gives its highest voltage and the induction motor *a* has the lowest normal speed. If the speed is to be still further reduced, the resistance *g* will be connected in by means of the switch *f*. The voltage drop of the rotor current in this resistance is now added to the voltage of the commutator machine or to that component of this voltage which is equal in phase with the slip ring voltage of the induction motor. The slip voltage and therewith the slip of the induction motor will therefore be increased without requiring a stronger excitation of the commutator machine.

In the foregoing discussion it has been assumed that the commutator machine is connected up as a shunt machine and that its excitation is regulated by means of an adjustable auto-transformer. The invention can, however, be used just as well with any other connection of the commutator machine such as compound or series connection or with other kinds of regulations such for example as the regulation which can be effected by brush displacement on the commutator machine or by the change of ohmic resistance in any one of a number of auxiliary circuits associated with the exciting winding of the commutator machine.

If the increase of the regulating range which is to be obtained by means of the resistance *g* is considerable, then when connecting in the resistance, and particularly when cutting it out, a very unpleasant jump in the power intake from the line and in the speed of the induction motor will occur. This jump may be decreased by subdividing the resistance into several steps and connecting the various portions of the resistance in and out in succession. Such an arrangement would be expensive since apparatus would be required including switches which would necessarily have to carry the full rotor current of the induction motor. In accordance with my invention, the resistance is preferably connected in and out as a whole and novel provision made for decreasing or avoiding the undesirable jump in the power intake of the cascade or in the speed of the induction motor. To this end, I provide apparatus for decreasing or increasing the voltage of the commutator machine at the same time the resistance is cut in or out respectively.

Fig. 2 illustrates curves obtained by plotting speed against the position of the voltage regulator, the speed being given in percent of the synchronous speed of the induction motor. Curve 1 applies for the normal regulation of the set, that is to say, when the resistance is not connected in the rotor circuit. Curves 2 and 3 apply with the resistance connected in, curve 2 being for a small load and curve 3 for a larger load on the induction motor. In the figure it is assumed that the commutator machine, acting alone, has a regulating range of 30% in 12 steps and that after connecting in the resistance, with the smaller load on the 4th step and with the larger load on the zero step of the regulator, the same speed is obtained as with the 12th step of the regulator when the resistance is not connected in. If the resistance is connected in on the 12th step of the regulating device, the latter should be set back with the smaller load to the 5th step and with the larger to the first step and then advanced again step by step to the 12th to decrease the speed. In the curves of Fig. 2 there is illustrated an increase in the total regulating range from 30% to 50% for the smaller load, or from 30% to 60% with the larger load and by properly manipulating the regulator, the entire resistance can be connected in at once and still avoid a large jump in the speed of the induction motor.

The voltage of the commutator machine may be regulated manually or automatically, for example in response to the power taken from the line. By automatic regulation the power taken from the line may be kept almost exactly constant and this automatic voltage regulation can be made independent of the resistance in the rotor circuit. For if the resistance is connected in after the regulating device has reached its last step, either by hand or automatically, the regulating device will automatically return to the required position illustrated by the curves in Fig. 2. If entire automatic regulation is used, the relay which cuts in the rotor resistance should be interlocked in some way with the position of the voltage regulator so that when the voltage regulating device is on the last step, the rotor resistance is cut in. This relay may, if desired, be made dependent on the speed of rotation so that it operates as soon as a speed is reached which corresponds to the last step of the voltage regulator. If for a given speed of the induction motor there always corresponds a given load throughout the range of operation, the actuating device for the speed regulation of the cascade can be further simplified in that the regulation of the voltage of the commutator machine and the connecting in and out of the resistance of the rotor circuit is effected by the same actuating device.

This is illustrated in Fig. 3 where *h* represents one phase of the regulating transformer, and *i* one of the movable contacts which slide on a contact path *k*. In this instance the contact path *k* contains 12 steps as assumed in Fig. 2 and which are similarly designated in the two figures. The contact $i$ is displaced with respect to the spindle $m$ by means of a hand wheel $l$, the spindle $l$ being threaded and the contact $i$ acting as a nut thereon. A contact operating lever $q$ pivoted at $p$ is arranged to be moved by the contactor $i$ so as to close or open the energizing circuit of a contactor switch $f'$ which now takes the place of the manually operated switch $f$ of Fig. 1. For the sake of simplicity, only one phase of the various circuits has been shown in Fig. 3. When the contact $i$ is moved from position 1 toward position 12, the arm $n$ of lever $q$ will be out of the path of movement of contactor $i$ with the short arm of lever $q$ against stop $r$. The arm $o$ of lever $q$ will, however, stand in the path of the movement of contactor $i$ so that lever $q$ will be turned clockwise when the contactor $i$ reaches position 12, contacts $s$ will be closed to energize relay $f'$ and the resistance $g$ will be connected in the rotor circuit of the induction motor. At the same time, the arm $n$ of lever $q$ will be swung into alinement with the contact $i$ so that when the latter is returned toward the zero position and is adjacent position 4, it will turn the lever $q$ in a counter clockwise direction thereby opening the energizing circuit of relay $f'$ and again establish the normal regulating conditions. If by this device the regulation has been carried to position 12, then by further movement of the hand wheel, contacts $s$ will be closed by the actuation of arm $o$ and the resistance connected up in the rotor circuit. It will then be necessary to regulate back to position 4 in order to again obtain the same speed as before on position 12.

In such an arrangement quite a strong current and shock will be produced in the main motor when connecting up the resistance and which only disappears after the regulation has been carried back a few steps. If this regulation is not done quickly, there will also be a jump in the speed of the induction motor. In most cases, it will be desirable to avoid this jump in current and the shock to the motor and this can be done in accordance with my invention if the regulating device is arranged so that in regulating the motor from the highest to the lowest speed, the regulator is always moved in the same direction whereby at first the voltage of the commutator machine is increased and then after reaching the highest permissible voltage, the resistance is connected in the rotor circuit and at the same time, by a further movement of the regulator, the voltage of the commutator machine is decreased to a desired value and finally, by a further movement of the actuating device, the voltage of the commutator machine is again increased with the resistance connected in the rotor circuit.

Such a regulator is illustrated in Fig. 4, where only one phase of the regulating circuit is shown for the sake of simplicity, the designations in this figure being the same as those in Fig. 3. The contact path $k$ in Fig. 4 has 20 steps instead of 12 and contact 13 is directly connected with contact 5, 14 with 6, 15 with 7, etc. The relay contacts for controlling the cutting in and out of the resistance in the rotor circuit must be so arranged with this switching device that when advancing from step 12 to step 13 the resistance is connected in and is again disconnected when returning from step 13 to 12. It is possible by this arrangement to reduce to a minimum the undesirable jumps in current and shocks to the motor. In this modification the lever $q'$ for operating the contacts $s$ is positioned adjacent contacts 12 and 13 and arranged so that when contact $i$ is advanced past this point in an upward direction to decrease the motor speed, contacts $s$ are closed while, when the contact $i$ is returned, these contacts are opened.

In Fig. 4 I have illustrated a reversible pilot motor $l'$ for adjusting the position of the controller instead of the hand wheel $l$ shown in Fig. 3. This pilot motor is connected to a suitable source, for instance the supply line $b$ of the main motor through a disconnecting and reversing relay $u$, the position of which is made dependent on the value of the line current supplied to the main motor. For instance, when the line current becomes of such a value as to overload the motor, the relay $u$ is strongly energized and closes the pilot motor circuit through the upper relay contacts, thereby causing the motor $l'$ to rotate in a direction to decrease the main motor speed. When the main motor current is normal, the relay $u$ stands in the intermediate position illustrated with the pilot motor circuit open and when the line current decreases to a low value corresponding to an underload condition of the motor, the lower contacts of relay $u$ are closed energizing the pilot motor in the reverse direction, thereby causing it to rotate in a direction to increase the speed of the main motor. In accordance with the purpose of the invention the load relay $u$ should of course be adjusted to obtain the least load shock to the apparatus when the resistance $g$ is cut in. The contacts controlled by the relay $u$ may, if desired, be controlled manually, or by a centrifugal governor driven from the main motor, or in any other desired manner.

The method explained above for the speed regulation of an induction motor can be advantageously employed in the control of the well known Ilgner converter where the slip resistance of the driving motor of the converter is replaced by a commutator machine connected in cascade with the driving motor and provided with the auxiliary adjusting resistance hereinbefore described. If such a converter serves, for example, for the operation of a rolling mill motor, whereby the load is taken off from the converter fly-wheel at every normal operating pass of the mill, however, only to the lowest limit of the normal regulating range given by the commutator machine alone, then the movable contact on the regulating transformer, referring to Figs. 2 and 3, will be adjusted at every normal operating pass of the mill from the zero position to position 12 and back again. If, however, there occasionally occurs a higher load on the rolling mill, for example, by the introduction of an insufficiently heated ingot, then it will become necessary to take a greater power from the fly-wheel and in order to avoid the taking of too great a quantity of power from the line, the auxiliary resistance $g$ may be inserted in the cascade connection. The automatic control of the Ilgner converter will then regulate beyond the position 12 in the manner described in connection with Fig. 4 to connect up the auxiliary resistance $g$ in the rotor circuit whereby a further regulating range becomes available so that an excessive increase of the power taken from the line can be effectively prevented with a very small increase in the cost of the regulating equipment. The size of the entire Ilgner converter may thus be decreased to that required for normal condition.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. The method of regulating an induction motor cascaded with a regulating exciter which consists in increasing the excitation of the exciter to substantially a maximum, thereafter inserting resistance in the cascade circuit and simultaneously decreasing the excitation of the exciter and then increasing the excitation of the exciter with the resistance in the circuit.

2. The method of regulating the induction motor cascade of claim 1, which consists in performing the operations and adjustments of claim 1 in the reverse order and direction respectively.

3. The method of regulating an induction motor cascaded with a regulating exciter, which consists in increasing the voltage given by the exciter to substantially a maximum, thereafter producing a voltage drop between the induction motor and exciter and simultaneously decreasing the voltage of the exciter a corresponding amount and then again increasing the voltage of the exciter.

4. The method of regulating the induction motor cascade of claim 3, which consists in performing the operations and adjustments of claim 3 in the reverse order and direction respectively.

5. In combination a wound secondary induction machine, a regulating exciter connected in cascade therewith, additional regulating means associated with the cascade for increasing the range of regulation, and a common actuator for adjusting both said regulating exciter and additional regulating means, so arranged that the regulation given by the exciter becomes substantially a maximum before the additional regulating means becomes effective.

6. In combination, a wound secondary induction machine, a regulating exciter connected in cascade relation therewith, a resistance, means for including said resistance in the cascade circuit, means for regulating the voltage of said exciter, said two means being interlocked by a common actuating device in such a manner that the excitation of said exciter is increased to substantially a maximum before said resistance is inserted and so that the voltage of the exciter is decreased to an amount substantially corresponding to the voltage drop in the resistance when the latter is inserted.

7. In combination, an induction machine a regulating exciter connected in cascade relation therewith, a voltage regulator for said exciter having a plurality of steps, so arranged that when the regulator is moved from one extreme position to the other the voltage of the exciter is first gradually increased and then suddenly decreased and again gradually increased, other means for producing a voltage drop in the cascade substantially corresponding to the said sudden decrease obtained by the voltage regulator, and a controller actuated by said voltage regulator when the suddenly decreasing voltage step is reached for controlling said means.

In witness whereof, I have hereunto set my hand this 26 day of July, 1923.

WALTER SEIZ.